Feb. 16, 1965    A. MACCHI ET AL    3,169,871
COOKING METHOD AND APPARATUS
Filed July 19, 1957    11 Sheets-Sheet 1

INVENTOR.
ALDO MACCHI
BY CALVIN D. MACCRACKEN

Feb. 16, 1965

A. MACCHI ET AL 3,169,871

COOKING METHOD AND APPARATUS

Filed July 19, 1957

INVENTOR.
ALDO MACCHI
BY CALVIN D. MacCRACKEN

INVENTOR.
ALDO MACCHI
BY CALVIN D. MACCRACKEN

INVENTOR.
ALDO MACCHI
BY CALVIN D. MACCRACKEN

Feb. 16, 1965   A. MACCHI ET AL   3,169,871
COOKING METHOD AND APPARATUS
Filed July 19, 1957   11 Sheets-Sheet 6

INVENTOR.
ALDO MACCHI
BY CALVIN D. MACCRACKEN

INVENTOR.
ALDO MACCHI
BY CALVIN D. MACCRACKEN

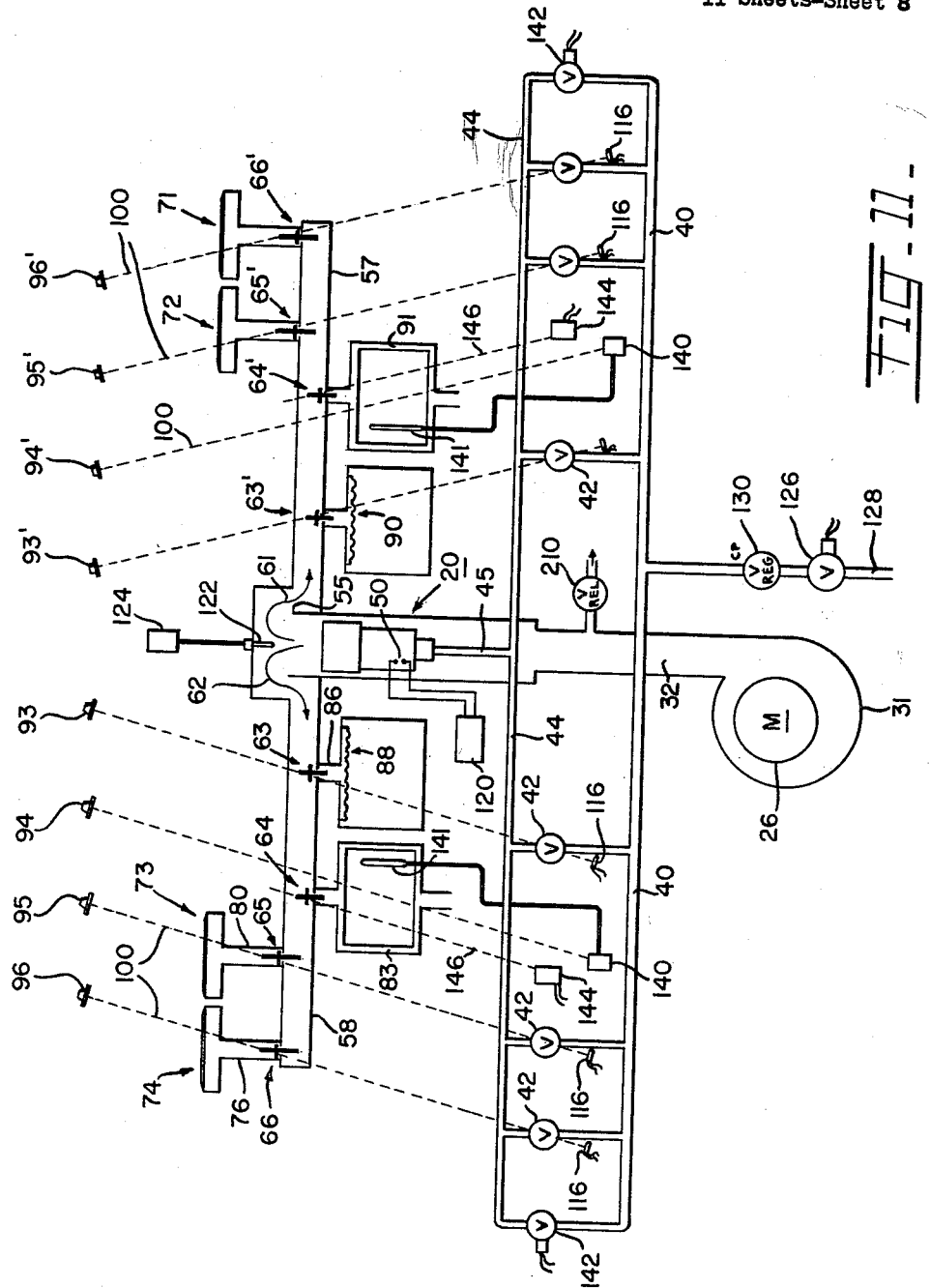

INVENTOR.
ALDO MACCHI
BY CALVIN D. MACCRACKEN

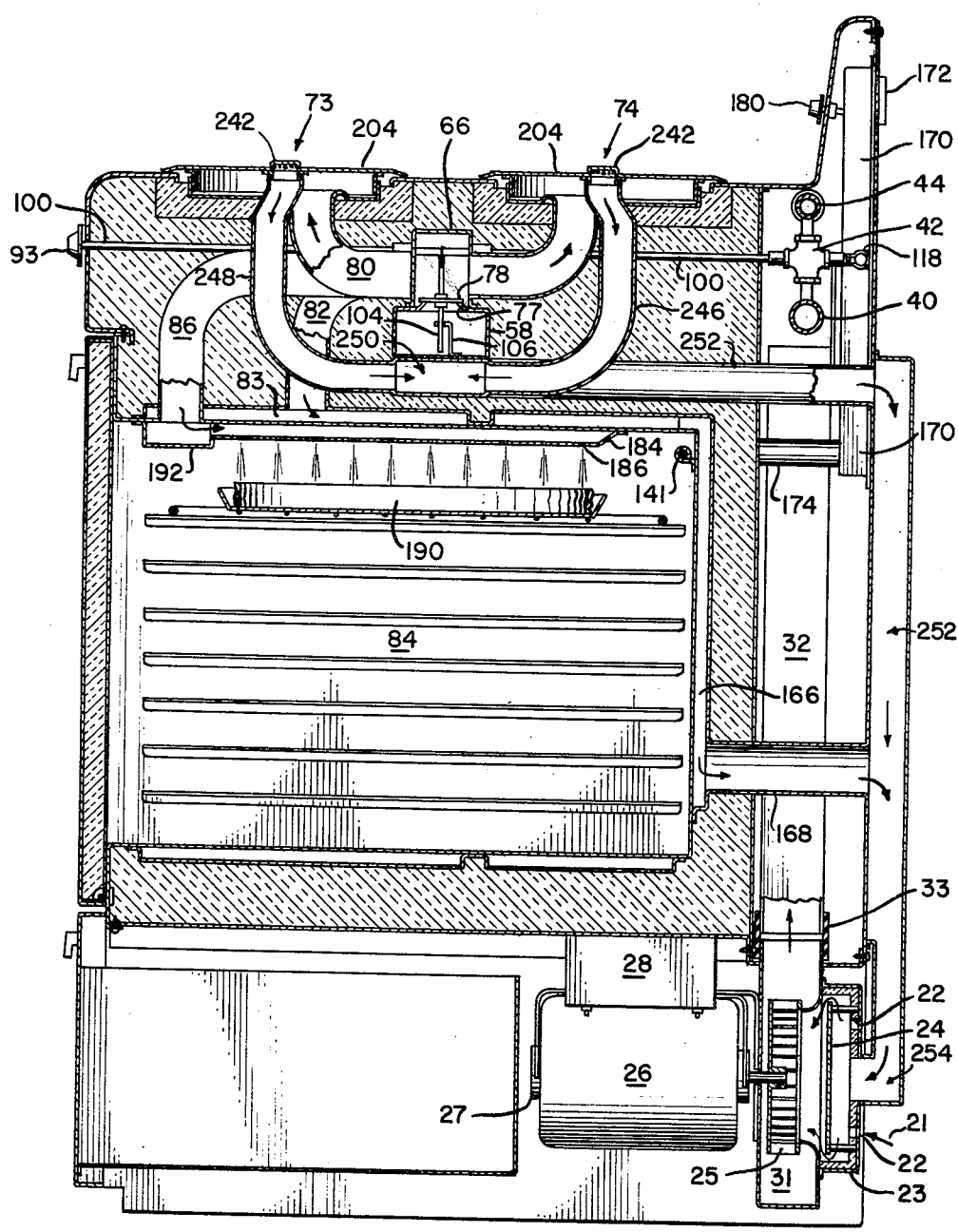

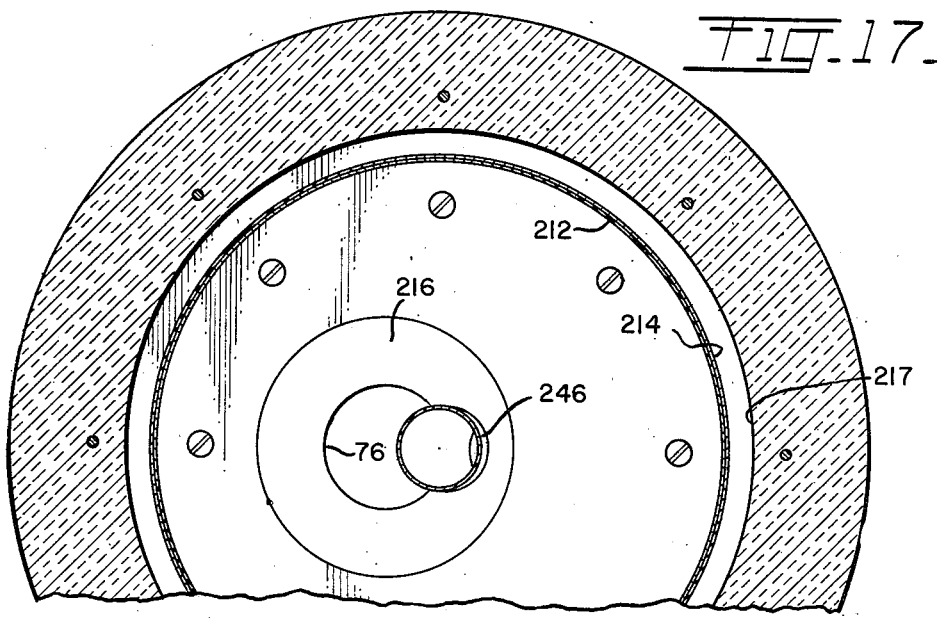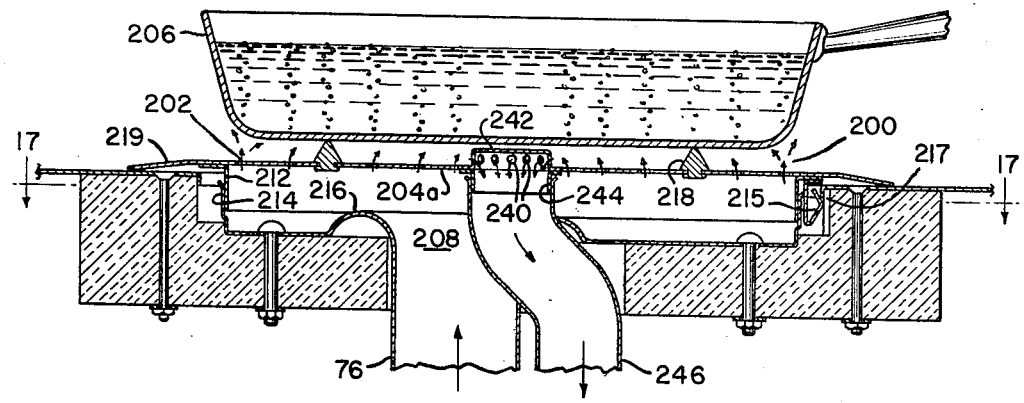

3,169,871
COOKING METHOD AND APPARATUS
Aldo Macchi, Belleville, and Calvin D. MacCracken, Tenafly, N.J., assignors to Whirlpool Corporation, St. Joseph, Mich., a corporation of Delaware
Filed July 19, 1957, Ser. No. 672,945
4 Claims. (Cl. 99—1)

The present invention relates to improved cooking methods and apparatus wherein heated gases are conducted at high velocity from a main heat source to the vicinity of the food or container which is to be heated and wherein heating action is obtained by impinging a plurality of high velocity jets of heated gases directly on the food or container.

The methods and apparatus of the present invention are extremely well suited for use in ranges of the home type and also for use in larger ranges for restaurants and hotels and other commercial eating establishments. This invention is described as embodied in a range for home use utilizing suitable combustible fuel which is burned in a central main heater. This main heater serves as a source of heat for heating high velocity gases that are then fed to one or more surface heating units or to one or more oven heating units. In another embodiment of this invention described herein the central main heater is electrically heated and similarly acts to heat the high velocity gases which transfer the heat to the food being cooked.

In typical ranges in use today which utilize combustible fuels, the fuel is burned closely adjacent to and in contact with the container or food being heated. For example, when broiling meat in a gas oven, the gas is usually burned directly over the exposed surface of the meat. When cooking food in a pan on a gas or oil range, the flames directly engage the bottom and often the lower portions of the sides of the pan.

There are certain disadvantages to these ranges now in use which are recognized by housewives and chefs. Because the food or container is directly exposed to the flame, a slight misjudgment often results in burning or scorching. When the water all boils out of a container, it rapidly overheats. The pan bottom becomes burned and warped, and in certain instances of severe overheating the pot or pan is destroyed. Even under proper cooking conditions, the direct contact between the flames and the surface of the container causes an accelerated deterioration of the container. There is a tendency for carbon to deposit on the container, so that periodically the container requires vigorous scouring to clean it up. Also, when in use the metal in the wall of the container is subjected to a relatively large temperature difference between its outside surface exposed to the flames and its inside surface which is cooled by liquid. As a result, there is a substantial difference in expansion between the outside and inside surfaces of the container wall which leads to warping and irregularities in the container after it has been in use for some time. Efforts have been made to overcome some of these problems by copper coating the bottom surfaces of pots and pans, but this makes them more expensive and is not a complete solution to all of these problems.

Another difficulty in ranges having surface heating units with exposed flame is the ever present danger of causing a fire. Any paper or fabric accidentally dropped on or brushed against the heating unit almost immediately is ignited. The temperature of the exposed flame is so high that it is usually unsafe to lean over or to reach over the surface heating unit. Thus, the controls on these types of ranges usually are near the front of the range where they can be touched without reaching over any part of the cooking area. Having the controls in front undesirably brings them down within the reach of children. In ranges of the type wherein gas is burned in a number of surface heating units or in one or more oven units, there is the problem of accidental extinguishing of the flames, for example when a pot boils over, liberating gas. Also, there is an effective upper limit to the rate of heating which can be obtained with an exposed flame heating unit. As the rate of fuel flow is increased beyond a certain point, combustion becomes less complete. The efficiency of the unit drops off sharply, carbon deposits rapidly build up on the sides and bottom of the container, and there is a tendency for the flame to become undesirably smokey.

Electric ranges commonly in use today have many of these same problems. For example, when an electric surface unit is on full power it usually becomes red hot, causing a fire hazard. Also, the bottom surfaces of pots and pans become warped from the large temperature difference between the red hot unit and the liquid inside the pot. As soon as the bottom surface of the pot or pan has become warped, only a few points actually engage the electric heater unit, and the remainder of the bottom surface is spaced up away from the heater. This causes a reduced and uneven rate of heating, which takes longer than desired to do the cooking. The uneven heating can cause burning of the contents of the pot and usually leads to further warping of the pot.

With exposed electrical heating units, it is difficult to obtain the precise temperature control desired. Only a limited number of control "steps" are available between the off and full power positions. Also, it is apparent that there is a definite upper limit to the heating rate which can be obtained.

The present invention desirably overcomes all of these problems and has many advantages over cooking methods and apparatus as known and used heretofore. Among the many advantages provided by the illustrative embodiments of the present invention are those resulting from the fact that a main or central heater is used. For example, the fuel is burned in this main heater under precisely controlled and highly efficient conditions. A blower supplies an excess of air assuring that complete combustion is always obtained. Thermostatic and safety controls enable a very wide range of precisely determined heating rates to be obtained and automatically shut off the fuel flow should the flame ever become extinguished.

In the illustrative embodiment of this invention including a central electrical heating unit thermostatic controls may also be employed to give a wide range of accurately regulated heating rates as desired.

By virtue of the fact that the combustion is carried out in an enclosed space under accurately controlled conditions with an excess of oxygen, the combustion is most efficiently and safely obtained. Heated gases are conveyed from the main heater to the individual heating unit where they are impinged as a plurality of small jets at high velocity directly upon the food or container. The temperature of these gases at the heating unit is about one-third that of a gas flame, and at a distance of ½ of an inch from the surface of the heating unit the temperature of the jets of heated gases is below that causing ignition of paper or fabric. Light combustible materials such as paper, powder, cloth, and so forth can be dropped or poured over the surface heating units without igniting because of the combined action of the repelling jets of heated gases and their low temperature.

Moreover, the action of these heated gases is such that it is entirely safe and comfortable to reach or lean over the surface heating units so as to adjust controls on the backboard. They issue at high velocity from a plurality of small orifices and impinge directly upon the container or food being heated. As a result of the high velocity of impingement efficient heat transfer is obtained between the heated gases and the object being heated. Advantageously, the maximum rate of heating for a given area of surface heating unit is substantially increased over that obtained from an exposed gas flame unit. By virtue of the carefully controlled combustion conditions in the central heater, the rate of fuel flow can be greatly increased when desired to produce faster heating than available from comparable sized surface heating units as known heretofore.

In addition, the temperature of the heated gases impinging on the container is sufficiently low to avoid burning, warping, or carbon deposits. In effect then, the illustrative embodiments of the present invention actually enable a faster rate of heating to be obtained at a lower absolute temperature at the surface of the container. For example, with a conventional large sized surface cooking unit in a gas range, the maximum heat output is usually at the rate of 12,000 B.t.u. per hour. Recently, specially designed surface cooking units for gas ranges have pushed the upper limit up to 15,000 and 18,000 B.t.u. per hour. However, the flames are unduly large and the heating action is such that it burns the porcelain off of the bottom of a porcelain pot and overheats the top of the appliance. In contrast to this, the present invention enables 25,000 B.t.u. per hour to be supplied to an identical pot from a surface cooking unit which has the same diameter, and the bottom of the porcelain pot remains clean and in new condition and without overheating the appliance.

For purposes of broiling meat or toasting bread or the like, the jets of heated gas are impinged directly upon the food. Again, a faster rate of cooking is obtained at a lower absolute temperature at the surface of the food itself. The direct impingement at high velocity of the many small jets of heated gas produces an intimate scrubbing action between the heated gas molecules and the clean surface of the container or the food which causes a very good transfer of heat from the gas to the object being heated.

Among the many further advantages of the present invention are those resulting from the fact that the heating action at the surface of the container can be turned on and off almost instantaneously without removing the container from the heating unit. This is entirely unlike an electric or gas heating unit of the prior art wherein the substantial metal portions of the unit become red hot. Turning off the gas or electricity does not stop the heating action which continues until these heavy metal parts have cooled. In the illustrative embodiments of the present invention the surface units have thin orifice plates of stainless steel or other suitable metal which do not become read hot and are so thin as to have very little heat storage capacity. When the flow of heated gases is shut off by means of a valve, the heating action is immediately effectively stopped.

The apparatus disclosed herein is easy to clean and maintain. The surface units and the oven units lend themselves to the use of stainless steel or the like. Because the absolute temperatures are lower there is less tendency to warp, tarnish, and the like.

A still further advantage results from the fact that the present invention enables a large amount of standardization in the construction of gas and electric ranges. For the most part their construction is identical, except that the main heater differs and so do certain specific details of the gas or electric connections and controls. Thus, a manufacturer is enabled to make the outside appearance and most of the construction of gas or electric ranges identical, resulting in economies from mass production. Please note that any fuel can be used, such as oil, alcohol, coal, wood, and so forth, with proper modification to the central burner unit and controls to suit the fuel.

In this specification and in the accompanying drawings, are described and shown improved cooking methods and apparatus as embodiments of the present invention and various modifications thereof are indicated, but it is to be understood that these are not intended to be exhaustive nor limiting of the invention, but on the contrary are given for purposes of illustration in order that others skilled in the art may fully understand the invention and the manner of applying the method and apparatus in practical use so that they may modify and adapt it in various forms, each as may be best suited to the conditions of a particular use.

The various objects, aspects, and advantages of the present invention will be more fully understood from a consideration of the following specification in conjunction with the accompanying drawings, in which.

Figure 1:
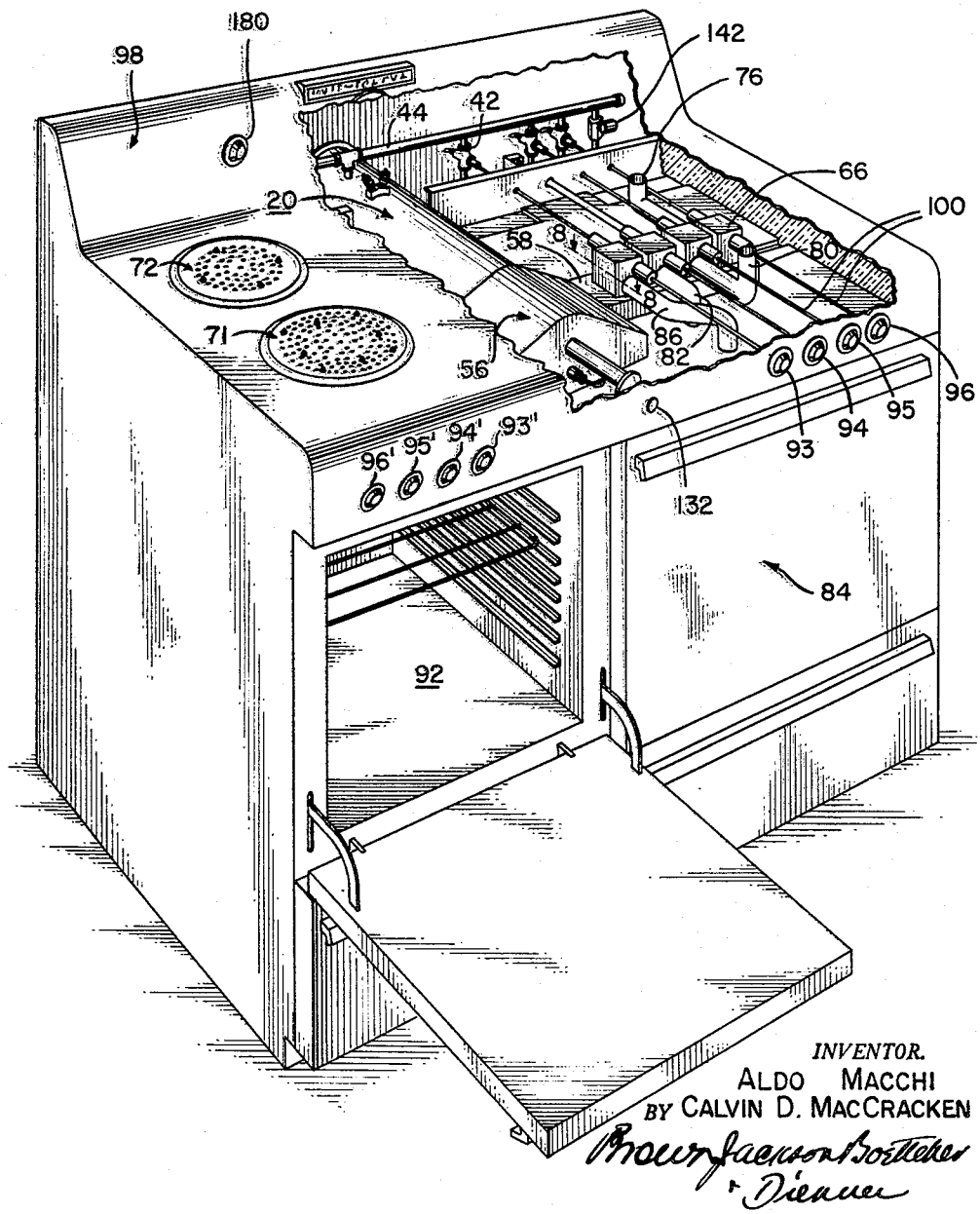
FIGURE 1 is a perspective view, shown partially cut away, of a gas cooking range embodying the improved cooking methods and apparatus of the present invention.
Figure 2:
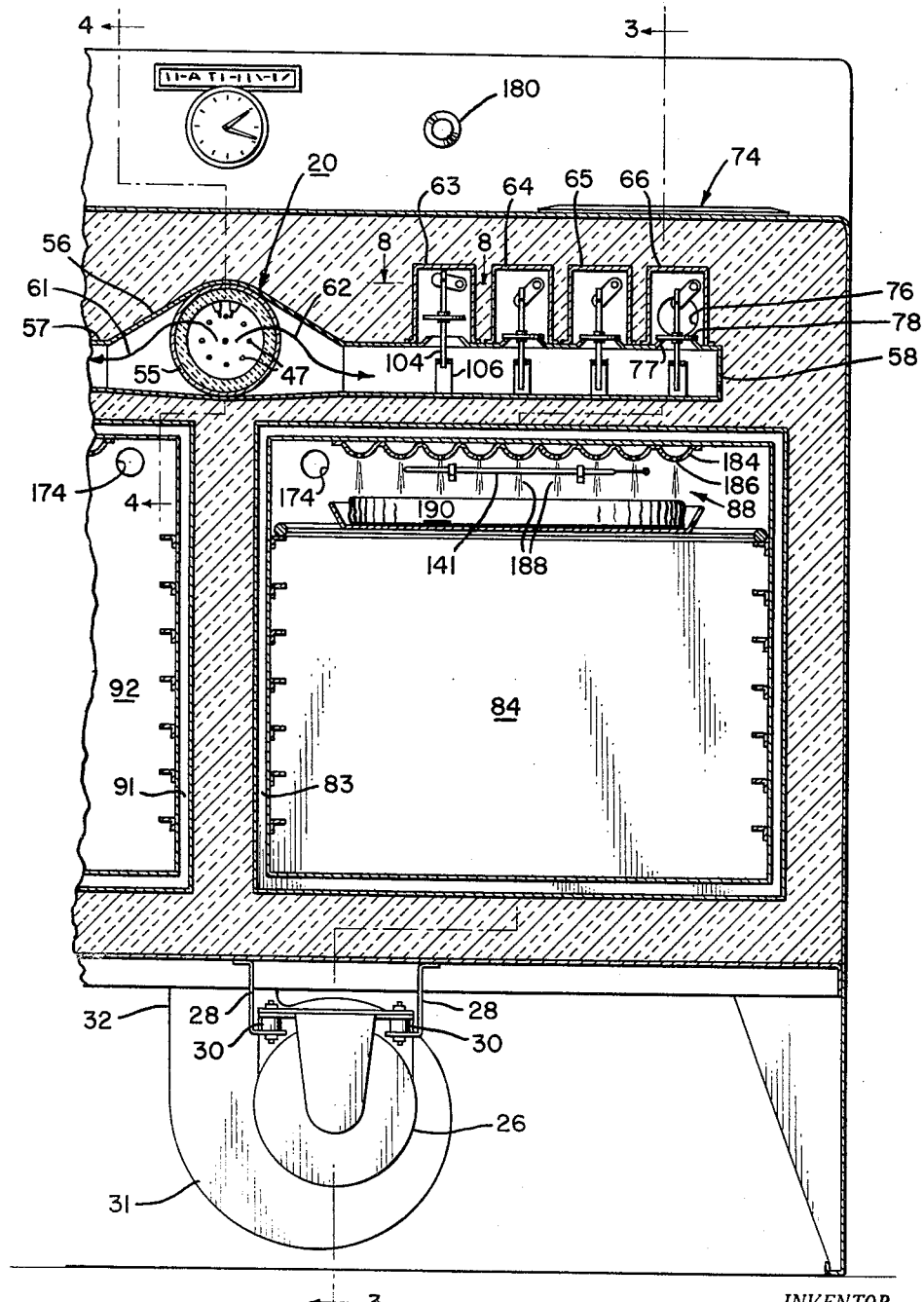
FIGURE 2 is an elevational cross sectional view through one of the ovens in the range of FIGURE 1 as seen looking from the front of the range into the oven with the intake blower shown near the center of the bottom of the range. The oven is shown in operation broiling a steak by direct impingement of a plurality of high velocity jets of hot gases.
Figure 4:
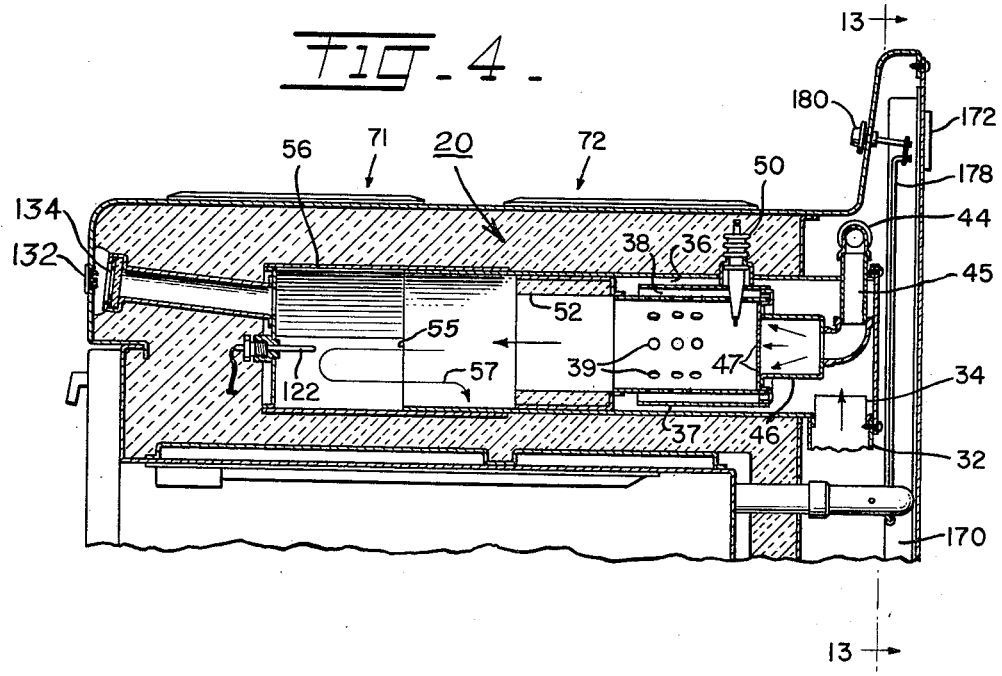
FIGURE 4 is a partial elevational sectional view taken along the line 4—4 of FIGURE 2 looking to the left and showing the arrangement of the fuel combustion chamber and associated apparatus.
Figure 9:
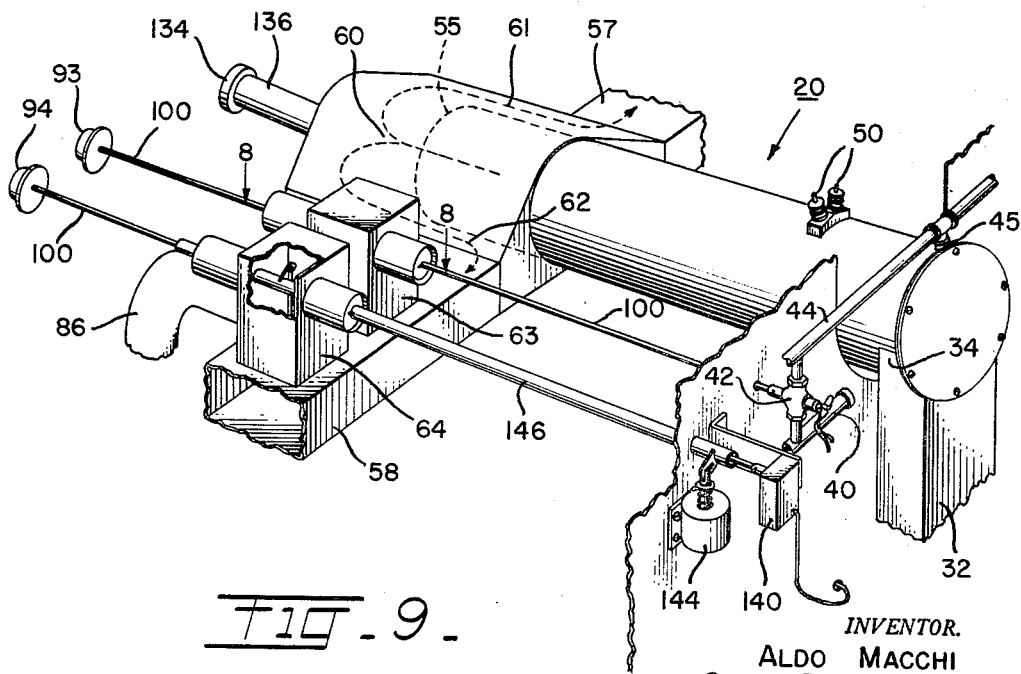
Figure 5:
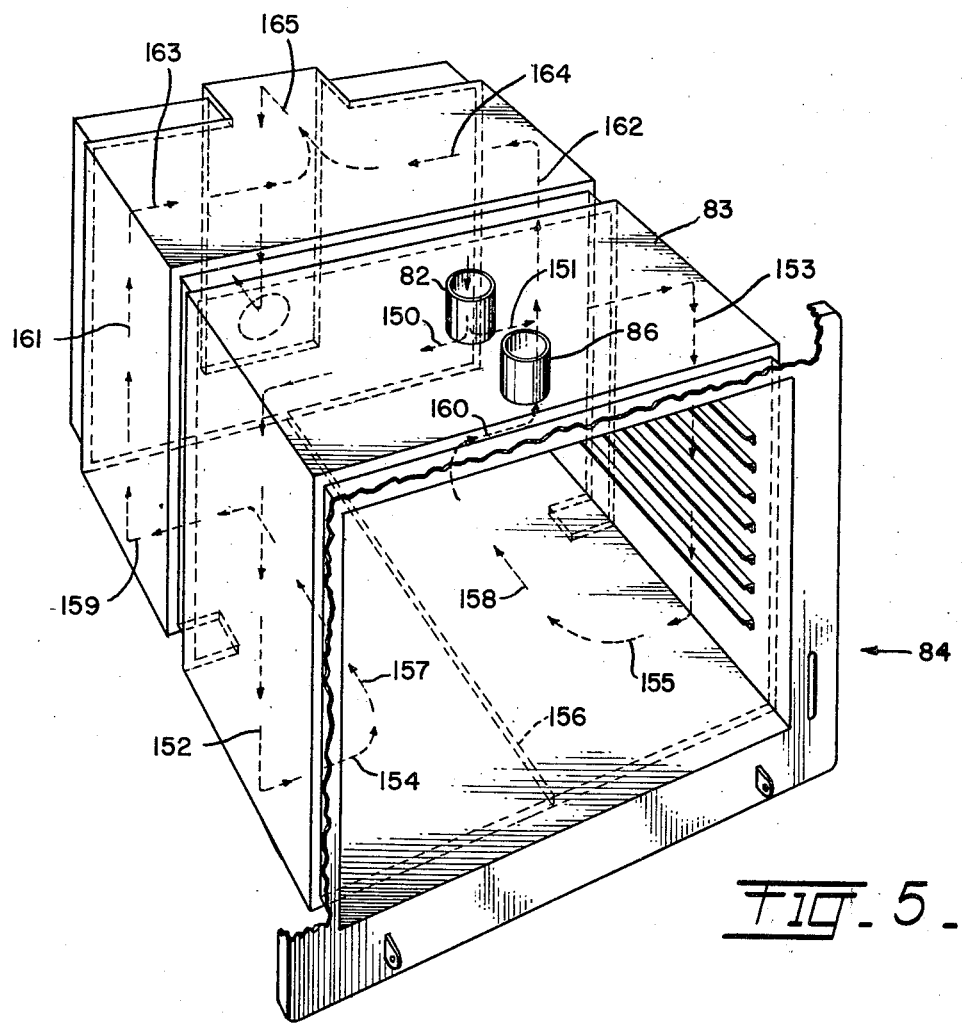
FIGURE 5 is a schematic perspective view showing the lining structure of one of the ovens and the paths followed by the hot gases when used to heat the oven.
Figure 8:
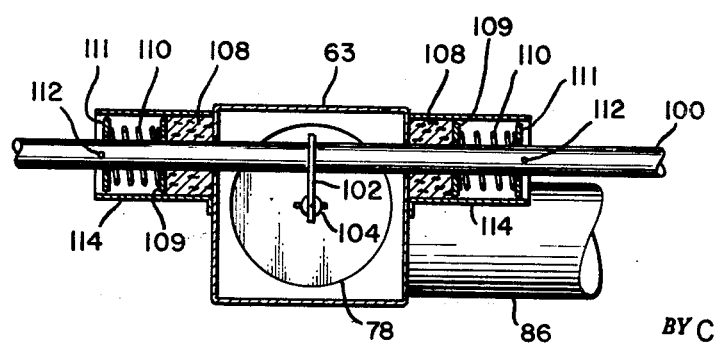
Figure 10:
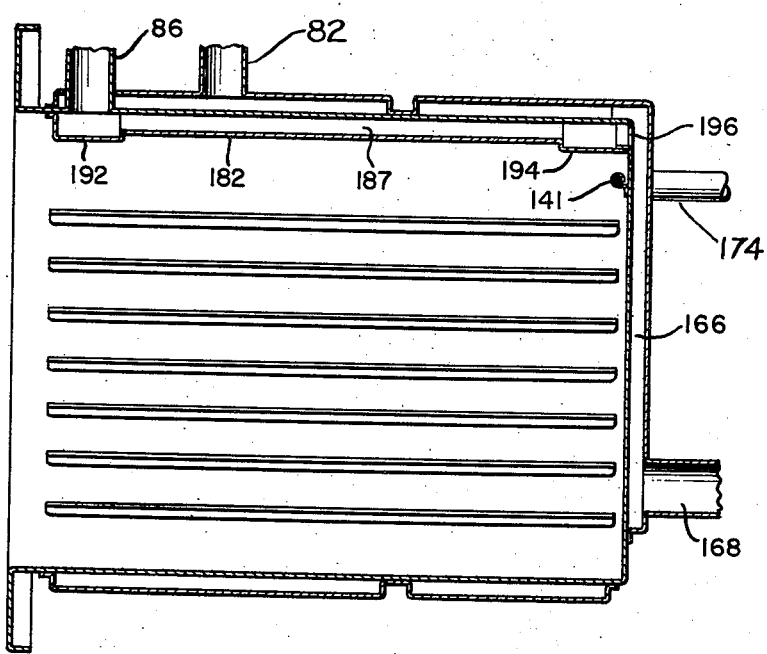
Figure 12:
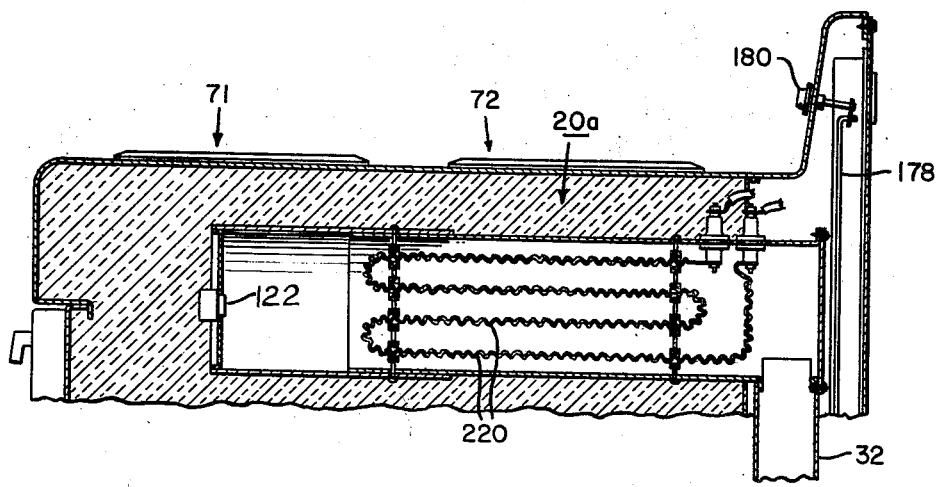
Figure 13:
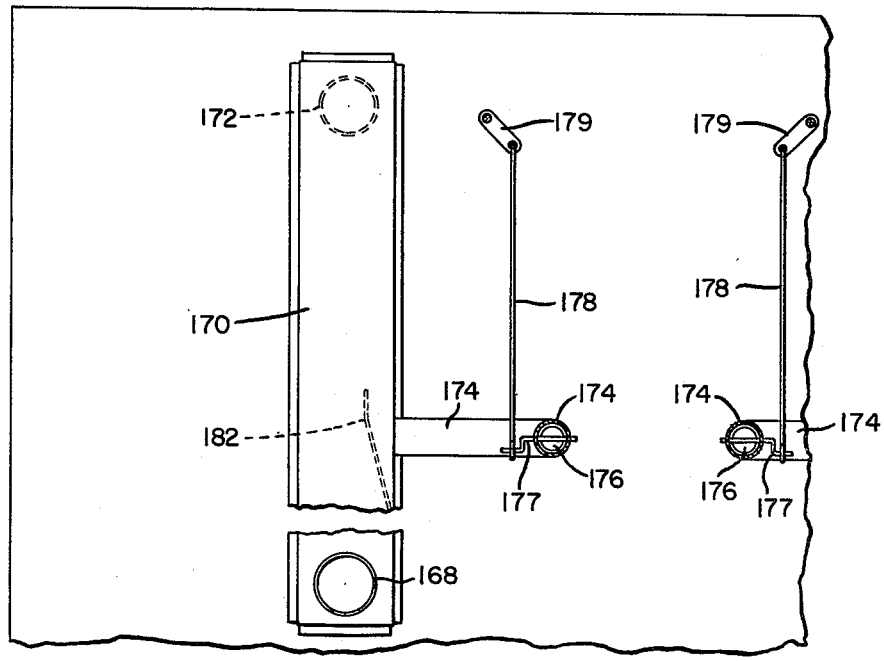
Figure 14:
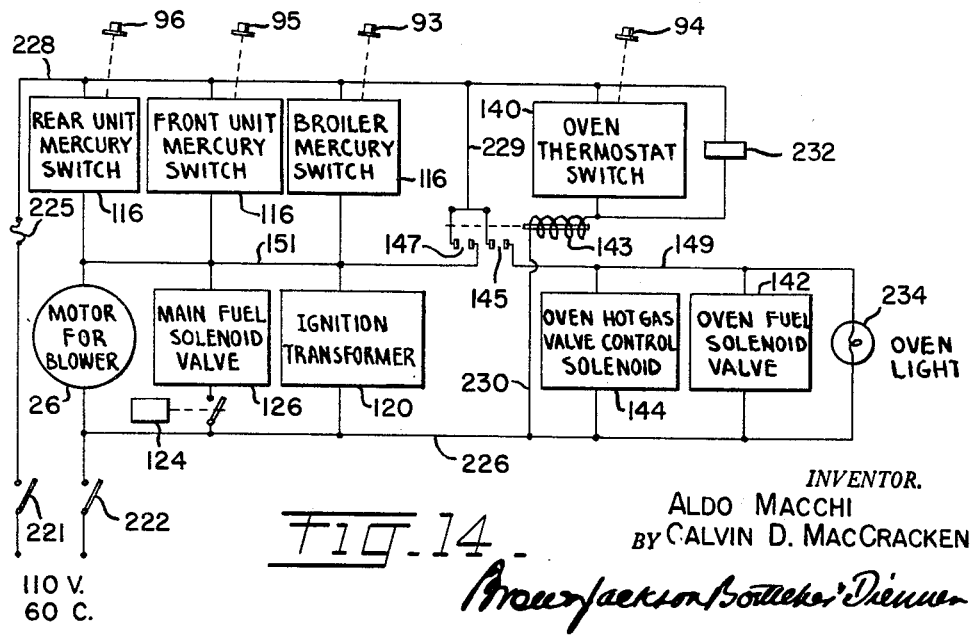

FIGURE 8 is a partial cross sectional view of one of the hot gas flow control valves, being taken along the line 8—8 of FIGURE 1, looking down, and also being taken along the lines 8—8 in FIGURES 2 and 9 looking down;

FIGURE 9 is a partial perspective view of the exterior of the fuel combustion chamber of FIGURE 4 and also illustrates associated apparatus including the main fuel manifold and control solenoids;

FIGURE 10 is an elevational cross sectional view of a modified form of the oven of FIGURES 2 and 5, being taken along the centerline looking to the left. This view is similar to FIGURE 3, except that the broiling action is obtained by radiant heat rather than by direct impingement of the hot gases;

FIGURE 11 is a schematic circuit diagram of the fuel connections and controls for the range shown in FIGURES 1–9;

FIGURE 12 is a partial elevational sectional view of a different form of heating chamber utilizing electricity;

FIGURE 13 is a partial elevational view from the rear of the range, showing the escape vents from the oven, the flow path of the gases or vapors being conducted away from the oven, and the control dampers therefor;

FIGURE 14 is a schematic diagram of the electrical circuit connections and controls for the range shown in FIGURES 1–9;

FIGURE 15 is an elevational cross sectional view of a modified form of range wherein a portion of the heated gases ejected from the surface cooking units are returned to the intake of the blower for recirculation through the heater unit. Also, the heated gas from the hollow jacket around the oven, and in certain cases from the broiler unit, are recirculated. This view in FIGURE 15 is similar to FIGURE 3, except that return ducts are shown, provided for recirculating heated gases from the surface cooking units and from the oven jacket to the blower intake;

FIGURE 16 is an elevational cross sectional view showing one of the surface cooking units of the recirculation type on enlarged scale. This view is similar to FIGURE 6, except that a return duct is shown provided near the center of the cooking unit; and FIGURE 17 is a plan sectional view of the cooking unit of FIGURE 16, being taken along the plane 17—17 looking downwardly.

In the illustrative embodiment of the present invention shown in FIGURES 1 through 9, inclusive, and in FIGURES 11 and 13, gaseous fuel is utilized and is burned in a main heater shown as a central combustion chamber, generally indicated at 20 in FIGURES 1, 2, 4, and 9. As shown by the arrows 21 at the lower right in FIGURE 3, the air is drawn in through a plurality of small openings 22 in a circular cover 23 lined with sound deadening material. The air passes around the periphery of a circular sound-deading baffle 24 which is spaced inwardly from the cover 23 and flows into the center of a centrifugal type impeller 25. This impeller is driven by an electric motor 26 which is supported at its axis by means of resilient torsional vibration damping mounts 27, and is mounted on the frame of the range by pairs of brackets 28 and resilient mounts 30, as seen most clearly in FIGURE 2. This impeller drives the air into a scroll-type discharge channel 31 and up a vertical air supply manifold 32 extending up the rear of the range and surrounded by a layer of sound deadening material 33. At its upper end (please see FIGURES 4 and 9), the air supply manifold feeds through a connection 34 into an outer annular chamber 36 surrounding the rear end of the combustion chamber. The airflow passes around the forward edge of a cylindrical baffle 37 and into an inner annular chamber 38. As it flows rearwardly it passes through a plurality of openings 39 into the combustion chamber itself.

In order to supply the gas and to control its flow in accordance with the number of cooking units which are in use, a gas supply manifold 40 (please see FIGURES 3 and 9) extends across the rear of the range. This manifold 40 is connected through a plurality of fuel valves 42 to a gas line 44 feeding into the main combustion chamber. These valves 42 are effectively in parallel so that the amount of fuel fed to the chamber 20 automatically increases as the number of cooking units in use increases. The operation of these valves 42 and their associated control apparatus is described in detail further below. As shown in FIGURE 4, the fuel from the line 44 flows down through a short nipple and elbow 45 into a fuel chamber 46 and then forward through several small orifices 47 into the rear of the combustion chamber, where it intimately mixes with the incoming air.

For purposes of ignition, a pair of spark plugs 50 extend into the combustion chamber and are suitably controlled along with the valves 42 as described below. A cylindrical lining 52 of refractory material lines the combustion chamber near the region of most intense heat, and suitable heat insulation material, such as glass wool or asbestos, surrounds the entire combustion chamber as indicated diagrammatically in FIGURE 4. The heated gases move forward at high velocity leaving the front end 55 of the combustion chamber and passing into the central part 56 of the hot gas supply manifolds 57 and 58 for the left and right sides of the oven. In this central part of the manifold 56, the hot gases divide as shown at 60 (FIGURES 9 and 11) for supplying the two sides of the range.

The individual flow paths 61 and 62 then describe U-bends and progress a short distance toward the rear of the range, passing outside of the front end 55 of the combustion chamber. The gas flow paths then curve out perpendicularly to the centerline of the combustion chamber and flow out into the two hot gas supply manifolds 57 and 58, respectively, to the left and right sides of the range. The course of these flow paths is also indicated in the schematic diagram of FIGURE 11, which represents the flow paths as seen from the rear of the range, so that the left and right sides are seen as reversed. This doubling back of the flow of the heated gases at the front end 55 of the combustion chamber 20 allows their temperature to become lower and more uniform throughout before reaching the two supply manifolds 57 and 58.

As seen in FIGURES 1, 2, 3, 8, and 9, a plurality of hot gas flow control valve units 63, 64, 65, and 66 are connected to the hot gas supply manifold 58. Similar valve units 63', 64', 65', and 66' (please see FIGURE 11) are connected to the other manifold 57 on the left side of the range. Each of these valve units controls the flow of heated gases to one of the four surface cooking units, such as is shown at 71 or 72 (please see FIGURES 1 and 11) or at 73 or 74 (please see FIGURE 3) or to one of the two ovens or two broilers, as explained in detail below. These valve units are generally identical except for the connections of their outlet ducts, and are positioned directly over the respective supply manifolds 57 or 58.

For example, attention is directed to the valve unit 66 at the right end of the manifold 58, which will be described in detail. It is completely enclosed on top and all sides except for a streamlined duct 76 which feeds rearwardly and up into the center of the bottom of the rear right surface cooking unit 74. A raised annular valve seat 77 upon which normally is seated a valve plug 78 serves to divide the interior of the valve unit 66 from the manifold 58. Raising the valve plug 78 to the wide open position immediately allows the hot gases to flow up into the surface cooking unit 74, and so this unit is immediately turned on full. Dropping the valve plug back down on its seat immediately turns off the surface cooking unit 74. Raising the valve plug 78 to intermediate positions throttles the gas flow to any desired amount, producing a wide range of continuous heat control.

The adjacent flow control valve unit 65 opens into a duct 80 running to the front right surface cooking unit 73. The valve unit 64 controls the flow through a duct 82 to a hollow jacket 83 around the right oven 84, as described in detail further below, and the valve unit 63 controls the flow of hot gases to a broiler unit 88 attached inside the top of the oven 84, as described further below. Similarly, the left valves 63', 64', 65' and 66' control the flow of hot gases to the left broiler 90, to the jacket 91 around the left oven 92, and to the surface cooking units 72 and 71, respectively.

In order to operate these eight hot gas flow control valve units, the range includes eight control knobs 93, 94, 95, 96, and 93', 94', 95', and 96', respectively. These knobs are shown as positioned at the front of the range, but by suitably changing the linkage they may be positioned on the back control panel 98. Each of these knobs is fixed to the front end of a rotatable shaft 100 that extends back and turns one of the individual gas control valves 42. Each of these shafts 100 passes through a respective one of the hot gas flow control units, such as the one passing through the unit 63, as shown in FIGURE 8. An arm 102 extends laterally from this shaft 100 within the interior of the unit 63 and has its free end loosely pinned to a vertically movable rod 104 which is secured to the valve plug disc 78. The lower ends of these rods 104 are loosely guided through a hole in a leg-shaped bracket 106 (please see FIGURES 2 and 3) extending up from the bottom of the manifold 58 beneath the respective valve plugs. Thus, by turning the control knobs a user controls both the setting of the respective hot gas flow control valve unit and the setting of the respective fuel control valve 42 at the same time.

To seal up these valve units, such as the unit 63 (please see FIGURE 8) at the positions where the shaft 100 passes through, an asbestos gasket 108 is pressed against the outside of the wall around the shaft 100 by a washer 109 backed up by a helical spring 110 held in position by a washer 111 and a pin 112 passing through the shaft and suitably housed in tubular extensions 114 projecting from opposite sides of the unit 63.

For purposes of turning on the blower, gas, and ignition, whenever one of the control knobs is turned, a mercury switch 116 (FIGURES 3 and 11) is supported between a pair of spring fingers 118 secured to the rear end of each of the six control shafts 100, for the four surface cooking units and for the two broiler units. The actions of the two oven controls 94 and 94' are somewhat different, as explained in detail later on. As the user begins to turn any one of these six knobs clockwise from the off position, the respective mercury switch 116 is tipped and closes an electrical circuit which energizes the motor 26 and energizes a step-up transformer and time-delay relay 120 connected to the ignition electrodes 50. For example, after an initial rotation of between 5° and 10° from the off position, the mercury switch 116 is tipped and closes. After this initial movement of a few degrees, then the respective gas valve 42 and the respective hot gas flow control unit, such as at 65 or 66, both begin opening and continue opening as the control knob is progressively turned over to the full on position, which is approximately 50° from the off position. After an appropriate delay of a few seconds, the time delay relay and transformer 120 turns itself off. Or, if desired, the ignition can remain on continuously whenever the motor 26 is energized.

In order to assure that the fuel flow will cease in case the combustion should ever become extinguished, a safety thermostat 122 senses the temperature at the discharge end 55 of the combustion chamber. This safety thermostat is coupled to a time-delay relay 124 which acts to control a solenoid valve 126 in the fuel inlet line 128 running to the inlet manifold 40. This solenoid valve 126 thus shuts off the fuel whenever the temperature at the discharge of the combustion chamber fails to rise after a few seconds, and it also shuts off whenever the temperature at the discharge of the combustion chamber inordinately drops when the range is in operation. A pressure regulating valve 130 in the line 128 establishes the desired pressure in the inlet manifold 40.

A small transparent button 132 (please see FIGURES 4 and 9) enables the user to look through a window 134 and along a view tube 136 directed toward the center of the combustion chamber 20 to inspect the flame, if desired.

As mentioned above, the controls for the two ovens 84 and 92 are somewhat different from those described for the surface cooking units. As shown in FIGURE 9 the shaft 100 from the oven control knob 94 runs back to a thermostatically controlled switch 140 which is also responsive to the temperature sensed by a bulb 141 in the oven. The initial turning of the knob 94 closes a temperature responsive contact (not shown) in the switch 140, and the closure of this contact energizes a solenoid 143 which in turn (please see FIGURE 14) closes two pairs of contacts 145 and 147, so as to energize a pair of electrical buses 149 and 151. Energization of the bus 149 turns on the valve 142 which is located between the manifold 40 and the gas line 44 so as to turn on the gas. Also, a hot gas flow control solenoid 144 is energized and rotates a hollow shaft 146 surrounding the shaft 100 and running to the hot gas flow control valve 64. Turning the knob 94 further clockwise serves to set the thermostatic switch 140 for a higher temperature.

When the temperature in the oven exceeds the desired temperature setting of the switch 140, the sensing bulb 141 causes the solenoid valve 142 to throttle down the fuel flow while the solenoid 144 turns the hollow shaft 146 to throttle down the flow of heated gases to the oven. In this way the desired oven temperature is maintained depending upon the setting of the knob 94.

FIGURE 5 illustrates the highly effective flow of heated gases through the jacket 83 around the oven 84. The heated gases enter through the duct 82 and then divide into two paths 150 and 151 moving first across the top of the front part of the oven, then down the sides 152 and 153 of the front part of the oven and underneath at 154 and 155 toward a center division 156 in the jacket. The flow then turns rearwardly at 157 and 158 in parallel paths and then turns outwardly again at 159 and 160, then passing up the sides 161 and 162 of the rear part of the oven and converging at 163 and 164 over the rear portion of the top. The combined flows 165 then pass back and down a rear passage 166 (please see FIGURE 3) to an outlet duct 168 coupled into the lower end of a vertical flue 170 having a rear outlet at 172.

In certain respects, the two separate portions of flow paths each may be considered as being U-shaped and as being effectively wrapped around its respective half of the oven from the centerline at the top to the centerline at the bottom. The front legs 150, 152, and 154 and 151, 153, and 155, respectively, of these two U-shaped paths are wider, as seen in FIGURE 5, because the initial gas temperature is higher and the more expanded gas volumes require greater cross sectional area of the flow path. Also, this initial greater area more effectively exposes more of the hotter gases to the inner wall of the oven for more efficient heating.

Among the many advantages of this arrangement is the fact that there is no combustion within the oven. Thus, when desired, the user may obtain substantially completely hermetically sealed cooking action which avoids loss of moisture and flavor from foods being cooked. A vent 174 from an upper rear corner of each oven is controlled (please see FIGURE 13) by a butterfly valve 176 operated by a crank arm 177 coupled to a control rod 178 and lever arm 179 connected to a knob 180. The vent 174 enters the flue 170 in the lee of a flow diverting baffle 182 which creates a reduced pressure in the flue 170 used to suck fumes out of the oven when broiling.

Figure 3:
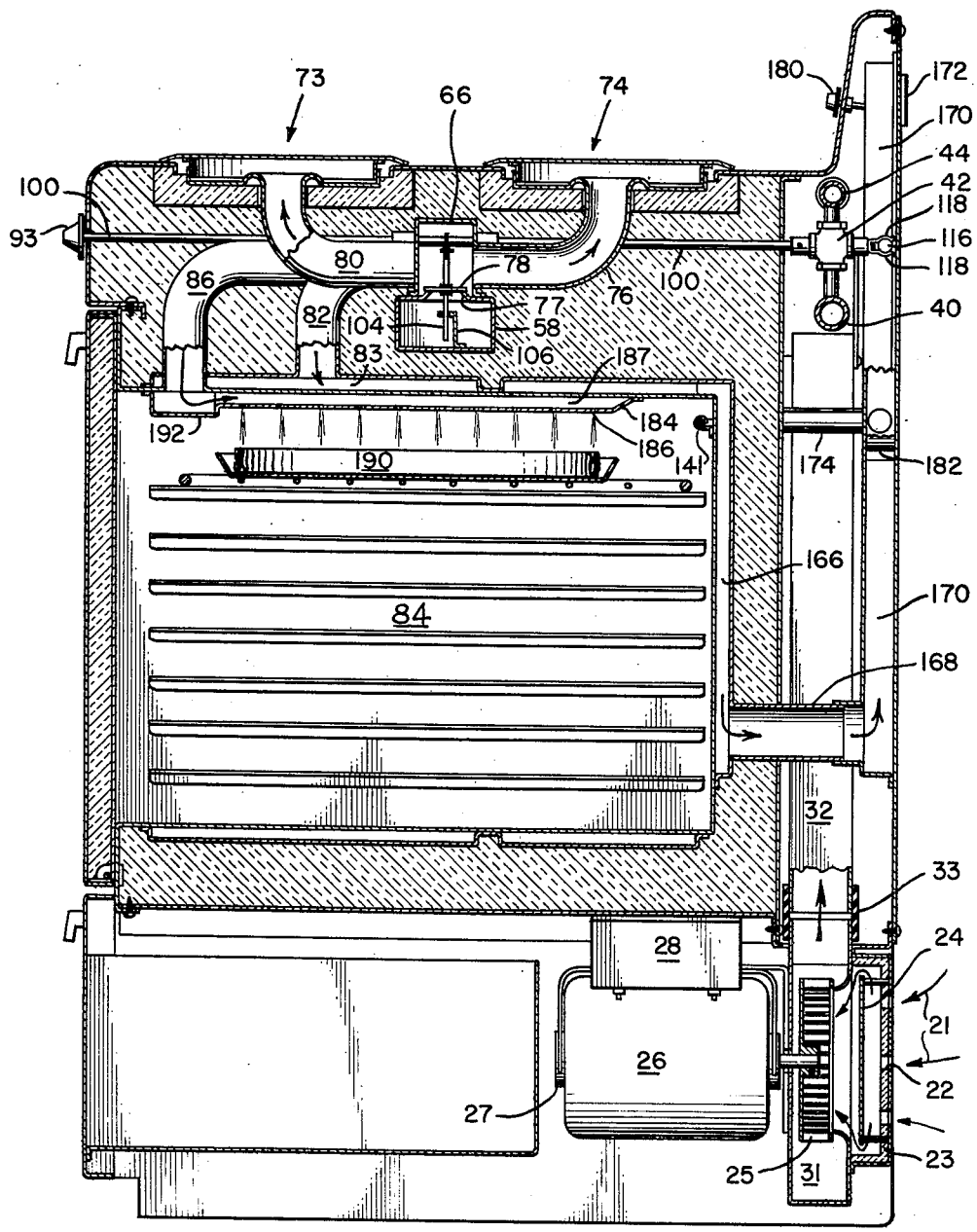
FIGURE 3 is an elevational sectional view of the oven being taken along the line 3—3 of FIGURE 2 looking toward the left.

In the preferred embodiment of the broiler 88, as shown in FIGURES 2 and 3, a fluted or scalloped sheet 184 is welded along spaced lines to the top of the oven and a plurality of small orifices 186 are formed along the crest 187 of each flute. These orifices direct a plurality of small diameter high velocity jets 188 of heated gas directly down upon the surface of the meat 190 being broiled or other food being toasted. The front ends of the parallel passages defined by the flutes in the sheet 182 all connect to an intake header 192 across the top of the oven beneath the intake duct 86.

In the other embodiment of the broiler shown in FIGURE 10, the heated gases are confined in passage by the sheet 182 which radiates heat down upon the food being broiled or toasted. The rear ends of the parallel passages 187 are joined by an outlet header 194 which is connected through a port 196 to the passage 166 at the rear of the oven.

The temperature of a gas flame is approximately 2000° F. within the combustion chamber 20. The temperature of the high velocity jets 200 (please see FIGURE 6) issuing from the multiple small orifices 202 in the thin circular surface heater plate 204 of stainless steel is within the range from about 800° to about 900° F. and preferably is in the range from 850° to 900° F. which has been found to be the best cooking, broiling, and toasting temperature range for most foods. This temperature is sufficiently low to avoid possibility of igniting paper or fabric and is safe and comfortable to reach over at a height of 4 inches or more above the surface cooking units described below.

Figure 7:
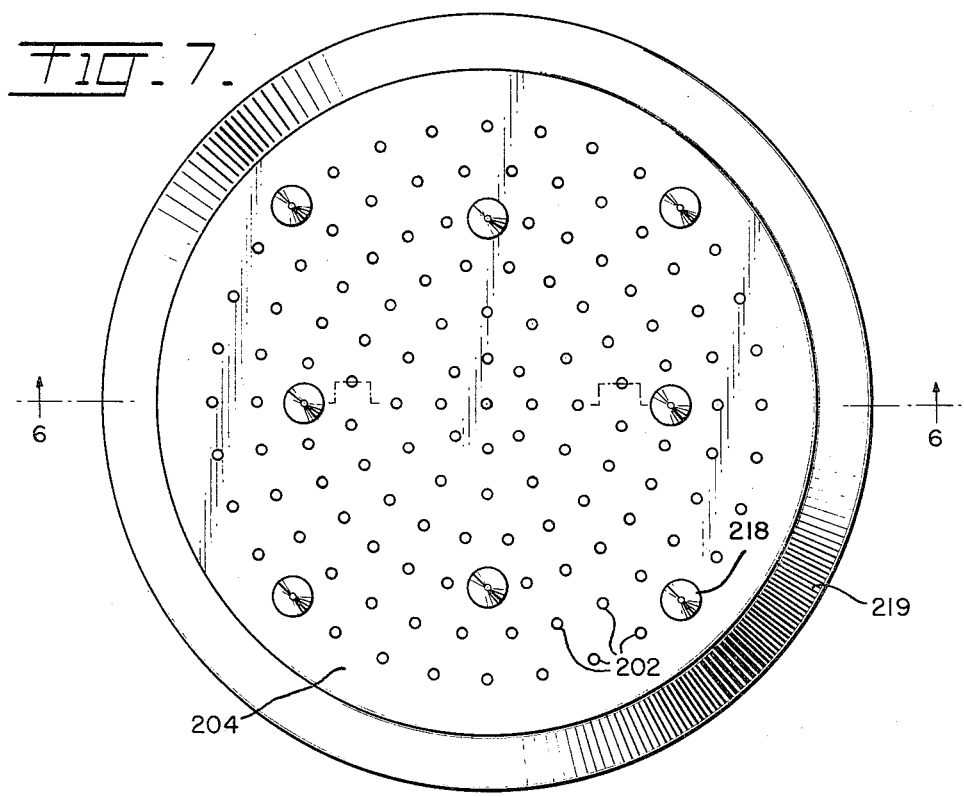
FIGURE 7 is a top view of the surface plate showing the concentric rings of multiple orifices and eight conical pan-supporting buttons suitable for many different sizes of pans.
Figure 6:
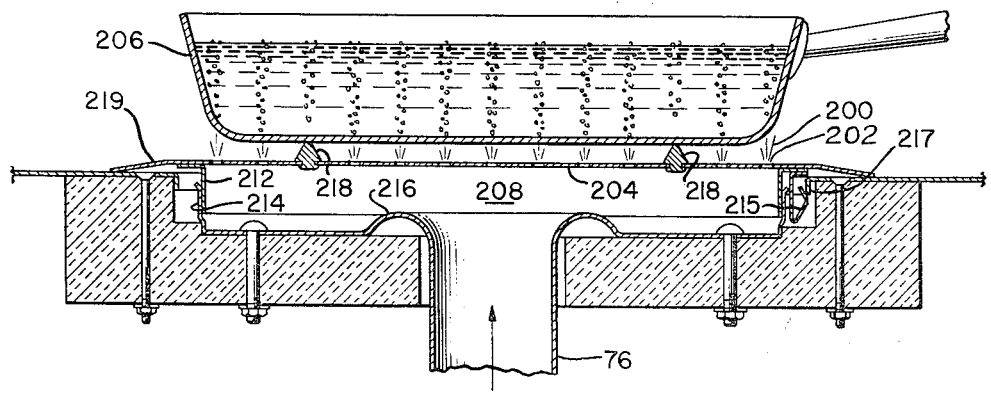
FIGURE 6 is an elevational cross sectional view showing one of the heating units on the work surface of the range in operation, with the high velocity direct impingement of the multiple jets of hot gases producing a rapid heating effect which is safe. This view is taken along the line 6—6 of FIGURE 7.

In order to explain the extremely effective heat transfer from the gases in the temperature range from 800° F. to 900° F. to the sauce pan 206 of water being boiled, it is recognized that the formula for heat transfer by convection shows that the rate of heat transfer increases as the 9/10 power of the velocity of gas flow. To a fairly close approximation, then, the rate of heat transfer increases almost directly as the velocity increases. Using a surface cooking unit as shown in FIGURES 6 and 7 and measured in terms of the amount of gas required to heat up two quarts of water from 80° F. to 200° F. in a standard type of saucepan, we have found that the efficiency of the present methods and apparatus are equal to the efficiency of the exposed gas flame when the jets 20 issue at a velocity of 4,000 feet per minute. That is, the same rate of B.t.u. into the water is obtained for the same fuel consumption. Increasing the velocity further increases the efficiency, but usually a velocity of about 4,000 feet per minute at the orifice 202 is most suitable and effective for home use.

In order to obtain these desirable relationships, each surface cooking unit is arranged to accelerate the flow of the heated gases just before they are impinged upon the object being heated. For example, in this illustrative embodiment of highly effective methods and apparatus, the flow of heated gases is formed into a plurality of high velocity jets of the heated gases which are aimed so as to impinge upon the object being heated. In this example, the surface plate 204 effectively constricts the flow of the heated gases and accelerates these gases out through the orifices 202. These orifices preferably have a mean effective diameter in the range from 1/16 of an inch to 1/4 of an inch, for example, they are shown as having a diameter of 3/32 of an inch. The plate 204 is shown, for example, as being about 1/16 of an inch thick, and the inner edges of these orifices are carefully chamfered to remove any burrs thus forming a bell-mouth entrance for the gases in accelerating up into each orifice. Approximately a total of 130 orifices are provided in a typical home surface cooking unit, giving a total open area of about 0.9 square inch. A pressure differential of an amount in the range from 0.74 of an inch of water to 1.50 inches of water is maintained between the interior 208 of the unit and the atmosphere. This pressure differential is usually approximately equivalent to 1 inch of water and is maintained by a pressure regulator valve 210 (please see FIGURE 11) on the duct 32 running from the blower to the combustion zone 20, which allows any excess air from the blower to escape.

The plate 204 is held in place by a downwardly extending annular flange 212 gripped on its outer surface by a plurality of inwardly pressing sleeves 214 making a substantially air-tight fit all around the interior space 208. The plate 204 is held down firmly by a plurality of clips 215 which include a shoulder pressing outwardly under an inwardly extending ledge 217 formed around the perimeter of the opening in the work surface of the range. By sliding a knife blade under the smoothly downturned rim 219 of the surface plate it is readily removed for cleaning. A rounded dam 216 around the mouth of the duct 76 prevents liquids from running down into the duct and provides a very desirable flow of the heated gases in the space 208.

The spacing between the bottom of the container 206 and the upper surface of the plate 204 has been found to be fairly critical, preferably lying in a range from 1/8 to 3/8 of an inch for average size surface cooking units and is here shown as being 7/32 of an inch, which works extremely well. This spacing is provided by a plurality of conical shaped support buttons 218.

FIGURE 14 shows the schematic wiring diagram for one side of the range, the other side is wired in an identical fashion. Suitable electrical energy such as 110 volt, 60 cycle house current is obtained from a pair of main lines 221 and 222 through a main switch 224 and a fuse 225 and is fed to a pair of wires 226 and 228, forming opposite sides of the range circuit. The three mercury switches 116 are connected from the wire 226 to the bus 151, so that this bus becomes energized whenever any one of the knobs 93, 95, or 96 is turned. The contacts 147 are also connected between the wire 228 and this bus by means of a lead 229, so that when the oven is in use this bus also becomes energized whenever the temperature in the oven drops below the value set by the knob 94. Between this bus 151 and the other side of the circuit are connected the blower motor 26, the main fuel solenoid valve 126, and the ignition transformer 120, and thus these are all turned on whenever the bus 151 is energized.

The oven thermostat switch 140 is connected across the circuit in series with the solenoid 143 by means of a lead 230, and a capacitor 232 of 0.1 microfarad capacitance is shunted across the switch 140 to reduce sparking at its contacts. As mentioned before, the contacts 145 energize the bus 149 to turn on the oven fuel solenoid 142 and also to energize the solenoid 144 for controlling the flow of hot gases to the oven. Also, an oven pilot light 234 is controlled by the contacts 145.

In addition to the many advantages described above there is another advantage provided by the method and apparatus of the present invention which will be more fully appreciated now that the operation of this illustrative embodiment has been explained. This method and apparatus enable the utilization of a large excess of air without any significant reduction in efficiency, as will be explained in detail. In ranges where the useful heat is extracted at the site of the burning of the fuel, any substantial excess of air results in a reduced heat at the burning site and thus undesirably reduces the efficiency.

However, in the method and apparatus described, the useful heat is extracted by impinging high velocity jets of heated gases directly upon the object being heated. Moreover, it has been explained that the effective rate of heat transfer is increased almost linearly with the velocity of impingement. Although the utilization of a large excess of air reduces the temperature within the central burner, this increased volume of air provides a correspondingly increased velocity of impingement which increases the rate of heat transfer so as to offset any reduction in temperature. By virtue of the use of a large excess of air, more complete combustion is assured. There is a marked reduction in unburned products such as carbon monoxide.

Advantageously, the controls are correlated for each of the surface units 71, 72, 73, or 74 so that when the output is at the rate of 9,000 B.t.u. per hour, the excess of air lies in the range from 200 to 300 percent. A somewhat larger excess of air is used for lower rates of heat output. When every unit, and both ovens and both broilers are turned on full, the excess air lies in the range from about 70 percent to 100 percent.

The upward blast also advantageously prevents spilled liquids from running down beneath the plate 204. Thus, the interior of the surface units rarely require cleaning, and the top surface of the plate 204 is very easily cleaned, providing easy maintenance for the user.

In the electrical range as shown in FIGURE 12, the combustion chamber is replaced by a main heater chamber 20A including a plurality of exposed resistance heating units 220. In cases where a resistance wire is supported so as to extend back and forth several times through the chamber 20A, it is found preferable to have the main lengths of the resistance units extend longitudinally in the chamber, as shown in FIGURE 12, rather than transversely. Having the main lengths of the wire loops extending longitudinally provides a more uniform heating effect from each wire. Thus, where several resistance wires are connected in circuit in parallel, the electrical loading on each parallel wire is approximately the same. The reason for this is the relatively large temperature gradient in the chamber 20A resulting from the continuous influx of cool air at the rear end supplied from the duct 32. A control thermostat 122 is provided at the center of the hot gas supply manifold.

In FIGURES 15, 16, and 17 is shown a further modification of the range which is being described herein as an illustrative embodiment of the present invention. In this modified range, a portion of the hot gases from the cooking region are returned to the intake of the blower and mixed with fresh cool air before recirculation through the main heater. This recirculation of a portion of the hot gases has the advantage of conserving heat, thus further increasing the efficiency.

When the main heater utilizes electrical heating, there is no percentage limitation on the amount of recirculated gases to be mixed with the fresh air before being passed through the main heater. Thus, the percentage by weight of recirculated gases in the mixture of fresh air and recirculated gases may be as high as is practical in each particular electric range.

However, when the main heater utilizes combustion heating, the percentage of recirculated gases is purposefully limited so as to assure an excess of oxygen of at least 70% in the combustion chamber at all times. This minimum is assured by providing a plurality of fresh air intake openings for admitting fresh air directly into the blower in parallel with the hot gases which are being returned.

As shown in FIGURES 15 and 16, hot gases from the center region over the right rear surface heating unit 74 are drawn in through a plurality of ports 240 in the cylindrical wall of a raised central cap 242. This cap forms an integral part of the surface plate 204A and includes a cylindrical skirt 244 projecting below the underside of the surface plate and telescoping snugly down into the flared mouth of a return duct 246. The surface plate 204A is readily removable like the plate 204.

In order to accommodate the mouth of the return duct 246 which is shown as being at the center of the surface cooking unit, the supply duct 76 is offset slightly from the center. The heated gases rushing up the duct 76 pass over the rounded dam 216 and are substantially uniformly distributed throughout the interior 208.

Similarly, the other surface cooking units of this range include removable surface plates having raised central caps communicating with return ducts, such as the duct 248 for the right front unit 73.

The return ducts 246 and 248 feed down into a right return manifold 250 which runs beneath the right supply manifold 58 toward the middle of the range. It joins a return header 252 which goes to the rear of the range and then down the back. This return header has a discharge 254 that feeds through the circular cover 23 into the intake chamber of the impeller.

Before reaching the impeller, the recirculated gases become mixed with the fresh air 21 being drawn in through the openings 22 in the cover 23. The percentage of recirculated gases in the resulting mixture is regulated by the size and number of the openings 22.

It will be understood that the left half of this modified range is similarly constructed. A left return manifold (not shown) runs under the left supply manifold 57 and joins with the return header 252.

In order to return the heated gases from the rear passage 166 of the hollow jacket 83 around the oven, the outlet duct 168 empties into the return header 252 as illustrated in FIGURE 15. Thus, all of the heated gases fed to the oven jacket 83 are returned for recirculation.

Similarly, in ranges utilizing a radiant type broiler as shown in FIGURE 10, all of the heated gases from the broiler unit are recirculated by passing through the rear passage 166 to the duct 168.

In the surface cooking units only portions of the heated gases are returned for re-heating. As indicated by the flow arrows in FIGURE 16 above the orifices 202 near the periphery of the surface plate 204, some portion of the heated gases after impingement upon the pan 206 flows upwardly along the walls of the pan. Nearer the center of the surface plate 204, a much larger portion of the heated gases after impingement upon the pan are drawn into the ports 240. The relative portions of the heated gases which are blown up along the walls of the pan and which are drawn in through the ports 240 for recirculation is controlled by the size and number of these ports, as may be desired.

From the foregoing it will be understood that the embodiments of the present invention described above are well suited to provide the advantages set forth, and since many possible embodiments may be made of the various features of this invention and as the method and apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention.

What is claimed is:

1. Apparatus for cooking, comprising: means defining a main heater chamber closed to ambient atmosphere; means for supplying gaseous fuel at superatmospheric pressure to said main heater chamber; means for supplying air at superatmospheric pressure to said main heater chamber in a quantity in excess of that required for substantially complete burning of the fuel in the chamber to generate heated gases therein, substantially all said burning taking place in said main heater chamber; means for causing ignition of the fuel in said heater chamber; means defining a heating unit remote from said main heater chamber; a conduit connecting the main heater chamber and heating unit for conveying said heated gases into said heating unit at superatmospheric pressure; a housing for containing food having a direct sealed connection with said heating unit and having a reduced outlet; and means for applying heat from the heated gases at the heating unit to cook food associated with said housing including means providing a plurality of jet openings directly between said heating unit and said housing and thereby providing a plurality of jets of heated gases at food cooking temperature playing directly into said housing and adapted to impinge directly on food therein.

2. The method of cooking, comprising: substantially completely burning fluid fuel in a burning zone in the presence of at least enough air to cause said burning to generate heated gases including fuel combustion products; maintaining said fuel, air and heated gases under superatmospheric pressure in said burning zone; conveying said heated gases while under said superatmospheric pressure in a confined path to a cooking zone remote from said burning zone; maintaining the heated gases under superatmospheric pressure in said cooking zone; and cooking food by impinging a plurality of jets of said heated gases at said cooking zone directly against said food.

3. The method of cooking, comprising: substantially completely burning fluid fuel in a burning zone in the presence of excess air over that required to cause said burning to generate heated gases including fuel combustion products and air; maintaining said fuel, air and heated gases under superatmospheric pressure in said burning zone; conveying said heated gases while under said superatmospheric pressure in a confined path to a cooking zone remote from said burning zone, the heated gases being under superatmospheric pressure in said cooking zone; and cooking food by impinging a plurality of jets of said heated gases at said cooking zone directly against said food.

4. Apparatus for cooking, comprising: means defining a main heater chamber closed to ambient atmosphere; means for supplying air at superatmospheric pressure to said main heater chamber; means associated with said main heater chamber for generating heated gases therein including said air at superatmospheric pressure, substantially all said providing of heated gases taking place in said main heater chamber only; means defining a heating unit remote from said main heater chamber; a conduit connecting the main heater chamber and heating unit for conveying said heated gases into said heating unit at superatmospheric pressure; a housing for containing food having a direct sealed connection with said heating unit and having a reduced outlet; and means for applying heat from the heated gases at the heating unit to cook food associated with said housing including means providing a plurality of jet openings directly between said heating unit and said housing and thereby providing a plurality of jets of heated gases at food cooking temperature playing directly into said housing and adapted to impinge directly on food therein.

References Cited in the file of this patent

UNITED STATES PATENTS

| | | |
|---|---|---|
| Re. 15,000 | Stafford | Dec. 7, 1920 |
| 784,073 | Robertshaw | Mar. 7, 1905 |
| 898,814 | Zehring | Sept. 15, 1908 |
| 1,089,911 | Detwiler | Mar. 10, 1914 |
| 1,257,716 | Leeper | Feb. 26, 1918 |
| 1,344,136 | Kobe | June 22, 1920 |
| 1,782,699 | Sauvage | Nov. 25, 1930 |
| 1,861,672 | Whisner | June 7, 1932 |
| 2,118,479 | See et al. | May 24, 1938 |
| 2,196,175 | Bornkessel | Apr. 9, 1940 |
| 2,617,404 | Prather | Nov. 11, 1952 |
| 2,713,861 | Biddle et al. | July 26, 1955 |
| 2,887,383 | Kopf | May 19, 1959 |

FOREIGN PATENTS

| | | |
|---|---|---|
| 411,958 | Great Britain | June 21, 1934 |
| 742,248 | Great Britain | Dec. 21, 1955 |